United States Patent [19]

Ziaylek, Jr.

[11] 4,245,281

[45] Jan. 13, 1981

[54] ADJUSTABLE HULL LIGHT ASSEMBLY

[76] Inventor: Theodore Ziaylek, Jr., Yardley, Pa.

[21] Appl. No.: 872,522

[22] Filed: Jan. 26, 1978

[51] Int. Cl.³ .................... B60G 1/00

[52] U.S. Cl. .................... 362/61; 362/64; 362/267; 362/282; 362/285; 362/291; 362/317; 362/362; 362/368; 362/372; 362/378; 362/433; 362/80

[58] Field of Search .................... 362/61, 80, 64, 282, 362/285, 291, 317, 319, 378, 433, 71, 267, 280, 362, 368, 372; D48/32 R

[56] References Cited

U.S. PATENT DOCUMENTS

| | | | |
|---|---|---|---|
| 2,800,575 | 7/1957 | Robertson et al. | 362/61 |
| 3,643,081 | 2/1972 | Szelea | 362/61 |

*Primary Examiner*—Benjamin R. Padgett
*Assistant Examiner*—J. L. Barr

[57] ABSTRACT

An adjustable hull light assembly for use mounted in the hulls of boats comprising a generally tubular housing member having a hull flange at one end thereof to facilitate securing of the housing to the boat hull to maintain orientation fixedly therebetween, further including a lamp socket fitted about the opposite end of the generally tubular housing, the lamp socket defining an annular slot in the interior surface thereof into which a sealed beam or other similar lamp may be positioned in a fixed orientation with respect to the lamp socket, the lamp socket preferably being made of a rubber material to pliably allow the lamp socket to be fitted about the interior end of the tubular housing, the interior end of the tubular housing about which the lamp socket is fitted should be generally arcuate with respect to the longitudinal direction of the tubular housing in order to allow an adjustment of the collimation of a lamp within the lamp socket to be coincident with or as adjustably required with respect to the axis of the tubular housing, the inner section between the slot within the lamp socket and the sealed beam lamp itself providing a sealing means to prevent the flow of water inward through the tubular housing and past the lamp to contaminate the wires therebehind, the housing preferably being made of polyvinyl chloride to resist corrosion and the like thereof.

10 Claims, 3 Drawing Figures

ADJUSTABLE HULL LIGHT ASSEMBLY

BACKGROUND OF THE INVENTION

1. Field of the Invention

The present invention deals with boat lights usable affixed to the hulls of ships, boats and other water craft to facilitate viewing of the surrounding environment during times of limited visibility. Various types of supplementary lights have been utilized on boats. However, the present invention provides a means for mounting a recessed lamp within a boat while at the same time allowing for adjustment of the collimation of the sealed light beam with respect to the tubular recessed housing.

2. Description of the Prior Art

Prior art inventions in this field have made the sealed lamp itself subject to the severely corrosive salt water and other environmental conditions including weather and the like and, as such, have limited the life span and the wattage of sealed beam lamps usable as viewing aids from boats. The present invention provides a means for recessing a high wattage sealed beam lamp by means of a tubular recessed housing of polyvinyl chloride. This recess however has heretofore been difficult due to the lack of an adjustment characteristic in order to assure the proper collimation of the lamp within the tubular housing and in order to possibly provide a variation control in order to change the angular orientation of the beam. The present invention provides this novel combination of a recessed lamp in addition to an adjustment means.

Also the damages caused to the wiring adjacent the lights used with boats heretofore has been prevented by the present invention due to the introduction of a sealing means between the slot inside of the rubber lamp socket and the outer peripheral edge of the sealed beam. This mating of these surfaces causes the sealing of the wiring and power lines leading to the sealed beam lamp and as such eliminates corrosion thereof.

SUMMARY OF THE INVENTION

An embodiment of the adjustable hull light assembly of the present invention includes a generally tubular housing member having a flange at one end thereof which extends outwardly therefrom to form a mating surface against the boat hull. At the other end of the housing an adjustment means is configured comprising an arcuate section of the generally tubular housing. This arcuate section is preferably spherical having the center of the spherical sector being located on the axis of the tubular housing.

The assembly further includes a lamp socket means which is adjustably secured to the spherical section of the generally tubular housing. The lamp socket means is adapted to receive therein a lamp means such as a sealed beam lamp which is mounted within a slot defined peripherally in the interior of the lamp socket means. Preferably the lamp socket means is of a rubber material to allow the lamp to be urged therein such that the lamp socket means will resiliently clamp the lamp into the slot means. A clamping means such as a hose clamp or the like may be positioned about the outer surface of the lamp socket means to secure the lamp socket means in firm abutment with the arcuate section of the tubular housing or with the sealed beam lamp along the slot means.

In this construction when the clamp means is loosened the entire rubber lamp socket means can be twisted perpendicularly with respect to the axis of the tubular housing in order to collimate the sealed beam lamp which is mounted within the slot means as desired. The lip means of the lamp socket means will thereby assume any chosen orientation over the spherical or arcuate section at the rear end of the tubular housing member.

The housing itself is preferably made of polyvinyl chloride to facilitate resistance to corrosion thereof. Also the flange means itself can be convex outwardly thereof in order to facilitate mating with the boat hull surface. The lamp socket means will include a lip means as well as a rear section. The rear section may be of a spherical or hemispherical shape in order to extend over the entire rear area of a sealed beam positioned therein and seal the terminals with respect to the external environment.

It is an object of the present invention to provide an adjustable hull light assembly which adjusts easily after installation with ball-like swivel.

It is an object of the present invention to provide an adjustable hull light assembly utilizing a sealed beam lamp wherein the terminal thereof are protected from shorts or damage.

It is an object of the present invention to provide an adjustable hull light assembly having a recessed bulb with full rubber cushioning which will not crack even with cold water contact.

It is an object of the present invention to provide an adjustable hull light assembly wherein contact between the water and the lamps is prevented thereby allowing increased wattage to be utilized for better night viewing.

It is an object of the present invention to provide an assembly utilizing a molded rigid polyvinyl chloride housing to minimize corrosion thereof.

It is an object of the present invention to provide an assembly which prevents vibrations or jarring which with other lights destroys the adjustment or collimation thereof.

It is an object of the present invention to provide an assembly which is easy to install and simply maintained.

It is an object of the present invention to provide an assembly whereby high candle power lamps may be utilized.

It is an object of the present invention to provide an assembly which is water and corrosion resistant in all respects thereof.

It is an object of the present invention to provide an assembly which is adjustable without the usage of any additional adjustment hardware other than the socket for mounting the lamp and the tubular recess.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings in which:

DETAILED DESCRIPTION OF THE PREFERRED EMBODIMENT

Figure 1:
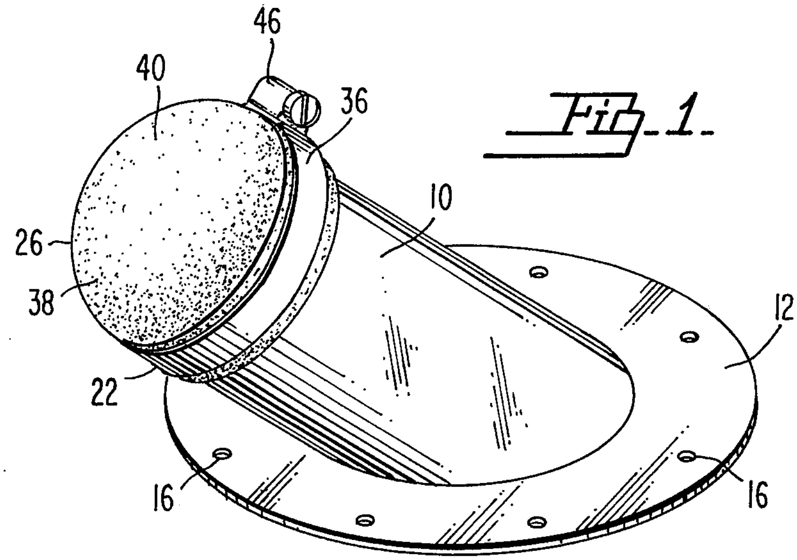
FIG. 1 is a perspective illustration of a preferred embodiment of the hull boat light assembly of the present invention.

The present invention includes a tubular housing member 10 which is adapted to be mounted to the hull 11 of a boat by means of a hull flange 12. The hull flange 12 preferably has a convex surface 14 projecting outwardly therefrom and is mountable to the boat hull 11 through the mounting holes 16 defined within flange means 12.

Figure 2:
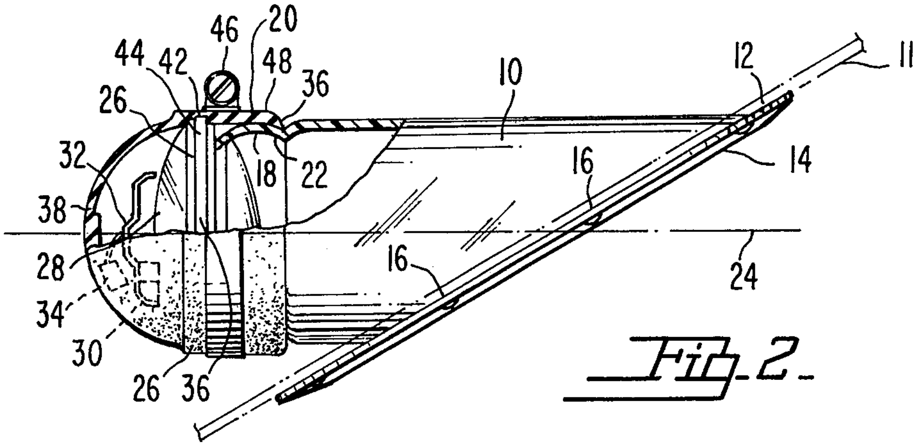
FIG. 2 is a cross-sectional side view of a preferred embodiment of the hull boat light assembly of the present invention.
Figure 3:
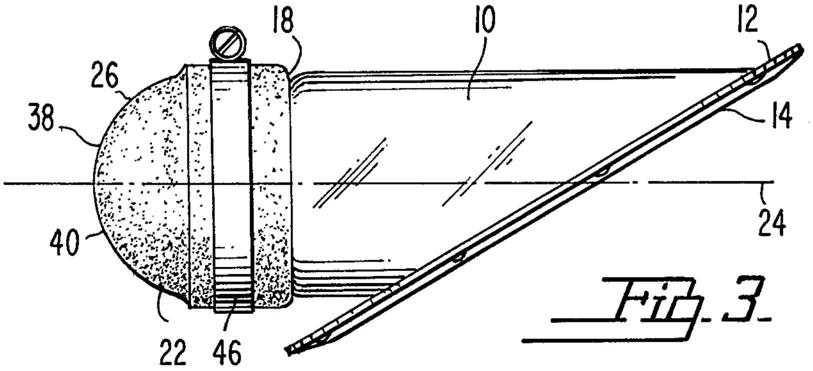
FIG. 3 is a top plan view of a preferred embodiment of the hull boat light assembly of the present invention.

A lamp socket means 26 is preferably adapted to be positionable about a rear section of the tubular housing 10 which is generally arcuate as shown in FIG. 2 as arcuate section 18 of housing 10. Lamp socket means 26 is adapted to receive mounted therein a light emitting means such as a sealed beam lamp 28. Preferably the lamp socket means itself is made of a rubber material and as such the sealed beam lamp can be wedged therein and the rubber socket means 26 will resiliently grip the lamp 28. To facilitate this interlocking a slot means 42 is preferably defined peripherally in the inner surface of the socket means 26 such that the sealed beam lamp 28 will have its peripheral edge fitted therein and be movable therewith.

In order to assure that the sealed beam lamp is collimated properly with respect to the axis 24 of the housing 10 an adjustment feature is incorporated in the present invention. This adjustment means 20 is provided by making the arcuate section 18 preferably configured as a spherical section 22. This spherical section is gripped by the lip means 36 of the lamp socket means 26 and by angular tilting of the socket means 26 will cause the lip means 36 to move over the spherical socket adjustment surface 48 and thereby alter as desired the collimation of the lamp 28 mounted within the lamp socket means 26. The socket means 26 will include a rear section 38 which may be configured as a spherical rear section 40 extending completely over the rear section of the lamp means and integrally connected to the entire rear peripheral area of the lip means to thereby completely seal the rear area of the sealed beam lamp 28. The terminal means 30 of the sealed beam lamp 28 on the back thereof will be connected to power supply lead 32 which will provide the path for the flow of power from the power supply means 34 to the terminal means 30 to thereby light the sealed beam lamp 28.

The lip means 36 of the lamp socket means 26 will be preferably formed of rubber as described above and as such the slot means 42 thereof will very tightly receive the sealed beam lamp 28 therein. As such, the splashing of salt water and other contaminants from the external environment when passing through the tubular housing member 10 will be prevented from contacting the electrical wiring of the lamp located behind the sealed beam due to the sealing means 44 created by the tight fixed connection between slot means 42 and the peripheral edge of sealed beam lamp 28. This sealing means 44 can be enhanced in effectiveness by the use of a clamping means 46 such as a hose clamp or the like which may be positioned around the exterior edge of the sealed beam adjacent the slot means and as such urge the slot means 42 of the lip means into firm securement with the peripheral edge of the sealed beam lamp. Also the clamp means can be moved forwardly toward the boat hull itself and as such when tightened will cause a fixed inner connection between the lip means and the socket adjustment surface 48 of the tubular housing member 10 to thereby fix the adjusting feature to prevent adjustment unless the clamping means itself is loosened. In this manner a fixed orientation or collimation between the light emitted from the sealed beam and the axis of the generally tubular housing 10 will be achieved. Of course the lamp socket means 26 could be re-oriented by loosening of the clamping means 46 and the clamping means 46 could be retightened after the new adjustment is achieved.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An adjustable hull light assembly comprising:

(a) a generally tubular housing member including a hull flange means extending laterally therefrom at one end thereof, said housing further including an adjustment means at the opposite end of said housing from said flange means, said adjustment means comprising the outer surface of an arcuate section of said tubular housing being longitudinally arcuate with respect to the axis of said tubular housing;

(b) a lamp socket means of rubber and adjustably secured only to the outer surface of said arcuate section of said generally tubular housing to form said adjustment means, said lamp socket means being adapted to receive a sealed beam lamp means therein to shine light outward through said tubular housing in a direction parallel with respect to the axis of said generally tubular housing member, said lamp socket means including:

(1) a lip means fitted peripherally about said adjustment means and said arcuate section to fit snugly therearound and provide an adjustment capacity to collimate a lamp means positioned within said lamp socket means with respect to the axis of said generally tubular housing;

(2) a rear section extending from said lip means and covering the rear area of a lamp means;

(3) a slot means defined peripherally in the interior surface of said lamp socket means to provide a mounting location for a lamp means positioned within said lamp socket means; and (4) a sealing means formed by the inner section of the mated surfaces of said slot means and a sealed beam lamp mounted within said slot means to prevent the flow of water and other contaminents from the external environment inwardly through said housing member.

2. The assembly as defined in claim 1 wherein said generally tubular housing member is made of polyvinyl chloride.

3. The assembly as defined in claim 1 wherein said flange means extends laterally outward away from the central axis of said generally tubular housing member to provide a mounting location with respect to a boat hull.

4. The assembly as defined in claim 1 wherein said arcuate section of said tubular housing which provides said adjustment means is configured as a spherical section with the spherical center thereof coincident with the central axis of the said generally tubular housing.

5. The assembly as defined in claim 1 wherein said rear section is hemispherical extending outwardly from said lip means.

6. The assembly as defined in claim 1 further comprising power supply means and power leads extending from the sealed beam to said power supply means, said power supply means and said power supply leads being connected within said rear section of said lamp means.

7. The assembly as defined in claim 1 wherein said hull flange means is convex to conform with the boat hull contour.

8. The assembly as defined in claim 1 further including a lamp means mounted within said slot means to shine light outwardly through said generally tubular member.

9. The assembly as defined in claim 1 further including a clamping means peripherally located around the exterior of said lamp socket means to selectively clamp the adjustment into a fixed position and to clamp said slot means against the lamp therein.

10. An adjustable hull light assembly comprising:

(a) a generally tubular polyvinyl chloride housing member including a hull flange means extending laterally outward from the axis thereof at one end thereof, said housing further including an adjustment means at the opposite end of said housing from said flange means, said adjustment means comprising the outer surface of an arcuate section of said tubular housing being longitudinally arcuate with respect to the axis of said generally tubular housing, said arcuate section of said tubular housing providing an adjustment means configured as a spherical section with the spherical center thereof coincident with the central axis of said generally-tubular housing; and (b) a lamp socket means of rubber and adjustably secured only to the outer surface of said spherical section of said generally tubular housing, said lamp socket means being adapted to receive a sealed beam lamp means therein to shine light outward through said tubular housing in a direction parallel with respect to the axis of said generally tubular housing member, said lamp socket means including:

(1) a lip means fitted peripherally about said spherical means to fit snugly therearound and provide an adjustment capacity to collimate a lamp means positioned within said lamp socket means with respect to the axis of said generally tubular housing;

(2) a rubber rear section extending from said lip means and covering the rear area of a lamp means; and (3) a slot means defined peripherally in the interior surface of said lamp socket means to provide a mounting location for a lamp means positioned within said lamp socket means, said slot means providing a sealing means created by the inner section of the mated surfaces of said slot means and a sealed beam lamp mounted within said slot means to prevent the flow of water and other contaminants from the exterior environment from flowing past the lamp ans.

* * * * *

UNITED STATES PATENT AND TRADEMARK OFFICE
CERTIFICATE OF CORRECTION

PATENT NO. : 4,245,281

DATED : Jan. 13, 1981

INVENTOR(S) : Theodore Ziaylek, Jr.

It is certified that error appears in the above-identified patent and that said Letters Patent are hereby corrected as shown below:

Column 6, line 31 should be amended to read "from flowing past the lamp means."

Signed and Sealed this

***Third* Day of *November 1981***

[SEAL]

*Attest:*

GERALD J. MOSSINGHOFF

*Attesting Officer* *Commissioner of Patents and Trademarks*